(12) United States Patent
Ku et al.

(10) Patent No.: US 8,730,951 B2
(45) Date of Patent: May 20, 2014

(54) APPARATUS AND METHODS FOR ORIGINATION OF VOICE AND MESSAGING COMMUNICATION IN A NETWORK

(75) Inventors: Bernard Ku, Austin, TX (US); Lakshminarashimhan Naidu, Pearland, TX (US); Armstrong Soo, San Ramon, CA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 0 days.

(21) Appl. No.: 13/486,013

(22) Filed: Jun. 1, 2012

(65) Prior Publication Data

US 2013/0322428 A1 Dec. 5, 2013

(51) Int. Cl.
*H04L 12/66* (2006.01)
*G06F 15/16* (2006.01)

(52) U.S. Cl.
USPC .......................................... 370/352; 709/227

(58) Field of Classification Search
CPC combination set(s) only.
See application file for complete search history.

(56) References Cited

U.S. PATENT DOCUMENTS

| | | | |
|---|---|---|---|
| 6,839,421 B2 * | 1/2005 | Ferraro Esparza et al. | 379/220.01 |
| 7,274,683 B2 | 9/2007 | Segal | |
| 7,277,421 B1 | 10/2007 | Pershan | |
| 7,328,281 B2 | 2/2008 | Takeda et al. | |
| 7,394,804 B2 | 7/2008 | Miyata et al. | |
| 7,502,923 B2 | 3/2009 | Poyhonen et al. | |
| 7,529,231 B2 | 5/2009 | Soo | |
| 7,796,578 B2 | 9/2010 | Stafford | |
| 7,974,295 B2 * | 7/2011 | Tuohino et al. | 370/401 |
| 7,996,541 B2 * | 8/2011 | Marathe et al. | 709/227 |
| 8,010,793 B2 | 8/2011 | Hoshino et al. | |
| 2004/0068584 A1 * | 4/2004 | Costa-Requena et al. | 709/246 |
| 2004/0246965 A1 * | 12/2004 | Westman et al. | 370/392 |
| 2005/0027867 A1 * | 2/2005 | Mueller et al. | 709/227 |
| 2006/0098621 A1 * | 5/2006 | Plata Andres et al. | 370/352 |
| 2008/0019356 A1 * | 1/2008 | Marsico | 370/352 |
| 2009/0010250 A1 * | 1/2009 | Ganesan et al. | 370/352 |
| 2010/0040048 A1 * | 2/2010 | Vormisto | 370/352 |
| 2011/0161505 A1 * | 6/2011 | Siegel et al. | 709/228 |
| 2011/0216762 A1 * | 9/2011 | Nas | 370/352 |
| 2013/0132593 A1 * | 5/2013 | Westman et al. | 709/228 |

OTHER PUBLICATIONS

Microsoft, "How DNS query works", http://technet.microsoft.com/en-us/library/cc775637(d=printer,v=ws.10).aspx, Jan. 21, 2005.
Schulzrinne, et al., "The Session Initiation Protocol (SIP)", Columbia University, Dept. of Computer Science, May 2001, 137 pages.

* cited by examiner

*Primary Examiner* — Clemence Han
(74) *Attorney, Agent, or Firm* — Guntin & Gust, PLC; Douglas Schnabel

(57) ABSTRACT

A method that incorporates teachings of the subject disclosure may include, for example, receiving a query from a call session server for a first pointer associated with a telephone number of a terminating device of a requested communication session, transmitting to the call session server the first pointer including a session initiation protocol uniform resource identifier associated with the terminating device to initiate an internet protocol communication session, receiving a notification from the call session server responsive to the call session server failing to initiate the internet protocol communication session, and transmitting to the call session server a second pointer including a telephone protocol uniform resource identifier for originating a circuit-switched communication session responsive to receiving the notification. Other embodiments are disclosed.

20 Claims, 6 Drawing Sheets

APPARATUS AND METHODS FOR ORIGINATION OF VOICE AND MESSAGING COMMUNICATION IN A NETWORK

FIELD OF THE DISCLOSURE

The subject disclosure relates generally to telecommunications and more specifically to an apparatus and methods for initiation of voice and messaging communications in a network.

BACKGROUND

As communications technology improves and demand for communication services grows, providers often seek to adjust those systems to incorporate the improved technology and expand those systems to accommodate the growing demand. Systems that are slow to adjust or expand can be undesirable and are often rendered obsolete. Systems that expand by providing unnecessary redundancy are inefficient and costly. Advances in telecommunication technologies create opportunities for integrating communication capabilities as well as challenges for transitioning between technological generations. Presently, some telecommunication consumers are subscribed for full access to services of internet protocol multimedia systems (IMS), while others are subscribed to legacy, non-IMS systems. It is desirable to allow non-IMS consumers to selectively access some IMS-based services, such IP-based messaging, while prohibiting similar access to IP-based voice calls to facilitate consumer acceptance and satisfaction with the IMS system while retaining incentives for full subscriptions.

BRIEF DESCRIPTION OF THE DRAWINGS

Reference will now be made to the accompanying drawings, which are not necessarily drawn to scale, and wherein.

DETAILED DESCRIPTION

Figure 1:
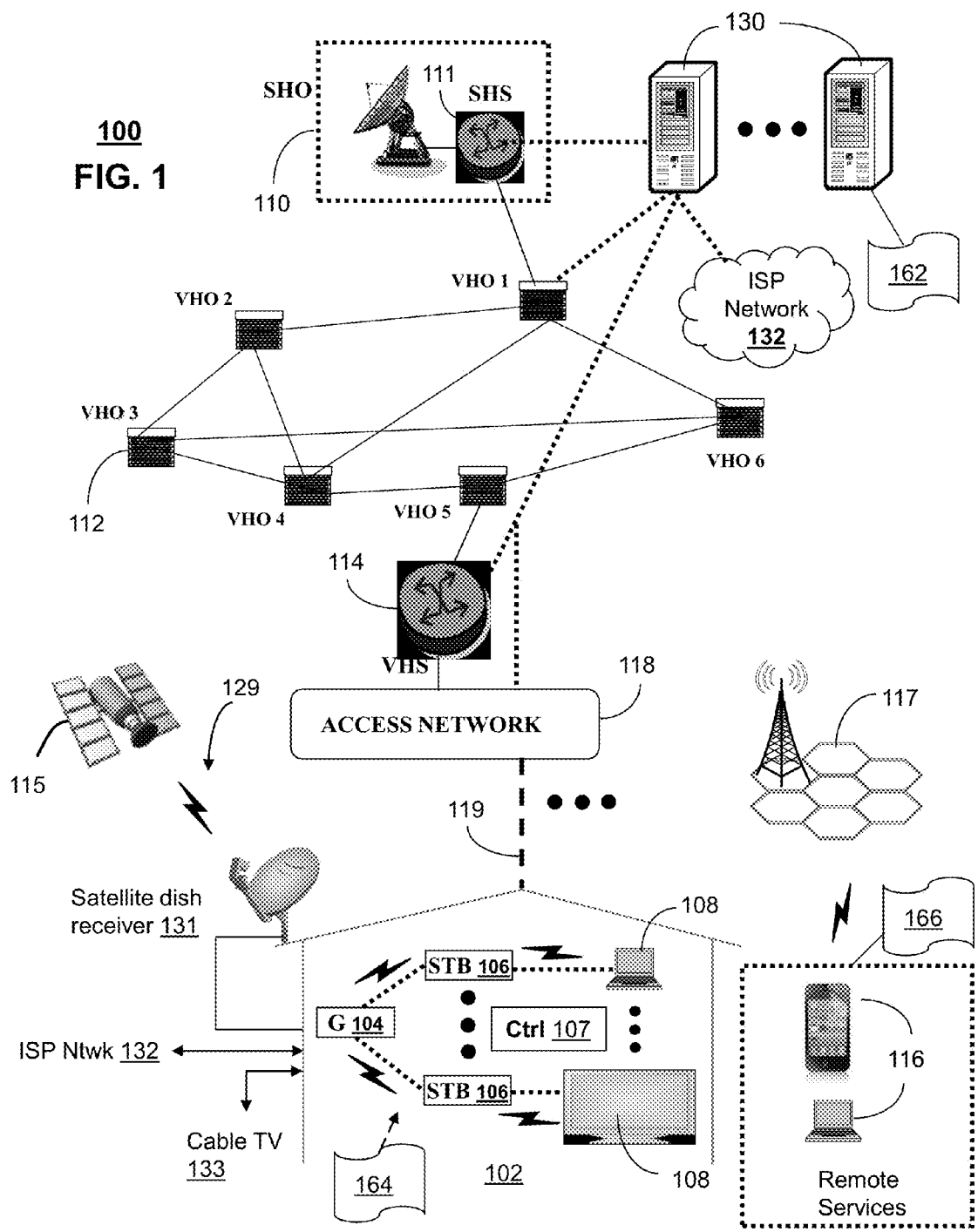
FIGS. 1-2 depict illustrative embodiments of communication systems that provide media services and that perform initiation of voice and messaging communications in a network.

The subject disclosure describes, among other things, illustrative embodiments for initiation of voice and messaging communications in a network. Other embodiments are contemplated by the subject disclosure.

One embodiment of the subject disclosure includes transmitting, by a telephone number mapping (ENUM) server, a first name authority pointer (NAPTR) to an originating call session control function (CSCF) server. The first NAPTR can include a session initiation protocol (SIP) uniform resource identifier (URI) associated with a terminating device. The method can include receiving, by the originating CSCF server, one of an identity of a terminating CSCF server associated with the terminating device or a notification of an unsuccessful identification of the terminating CSCF server. The method can include transmitting, by the originating CSCF server, the SIP URI of the first NAPTR to the terminating CSCF server to initiate a packet-switched communication responsive to the receiving of the identity of the terminating CSCF server. The method can further include transmitting to the originating CSCF server, by the ENUM server, the second NAPTR comprising a telephone (tel) protocol URI associated with the terminating device responsive to receiving the notification of the unsuccessful identification of the terminating CSCF server. The method can, in turn, include transmitting to a media gateway control function (MGCF) server, by the originating CSCF server, the tel URI of the second NAPTR to initiate a circuit-switched communication session with the terminating device.

One embodiment of the subject disclosure includes a device having a memory storing computer instructions and a processor coupled to the memory. The processor, responsive to executing the computer instructions, can perform operations for receiving from a telephone number mapping (ENUM) server a first pointer including a session initiation protocol (SIP) uniform resource identifier (URI) associated with a terminating device. The processor can also perform operations for transmitting a request to a subscriber server for an identity of a terminating call session server associated with the terminating device. The processor can, in turn, perform operations for receiving from the subscriber server one of an identity of the terminating call session server or a notification of an unsuccessful identification of the terminating call session server. The processor can perform operations for transmitting the SIP URI of the first pointer to the terminating call session server for originating a circuit-switched communication session with the terminating device responsive to receiving the identity of the terminating CSCF server. The processor can perform operations for receiving a second pointer including a telephone protocol (tel) URI associated with the terminating device responsive to receiving the notification of the unsuccessful identification of the terminating CSCF server. The processor can further perform operations for transmitting the tel URI of the second pointer to a gateway server to initiate a circuit-switched communication session with the terminating device responsive to receiving the second pointer.

One embodiment of the subject disclosure includes a computer-readable storage medium, including computer instructions, which when executed by at least one processor cause the at least one processor to perform operations for receiving a query from a call session server for a first pointer associated with a telephone number of a terminating device of a requested communication session. The processor can also perform operations for transmitting to the call session server the first pointer including a session initiation protocol uniform resource identifier associated with the terminating device to initiate an internet protocol communication session. The processor can perform operations for receiving a notification from the call session server responsive to the call session server failing to initiate the internet protocol communication session. In turn, the processor can perform operations for transmitting to the call session server a second pointer comprising a telephone protocol uniform resource identifier for originating a circuit-switched communication session responsive to receiving the notification.

FIG. 1 depicts an illustrative embodiment of a first communication system 100 for delivering media content. The communication system 100 can represent an Internet Protocol Television (IPTV) media system. The IPTV media system can include a super head-end office (SHO) 110 with at least one super headend office server (SHS) 111 which receives media content from satellite and/or terrestrial communication systems. In the present context, media content can represent, for example, audio content, moving image content such as 2D or 3D videos, video games, virtual reality content, still image content, and combinations thereof. The SHS server 111 can forward packets associated with the media content to one or more video head-end servers (VHS) 114 via a network of video head-end offices (VHO) 112 according to a common multicast communication protocol.

The VHS 114 can distribute multimedia broadcast content via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provide broadband services over fiber optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote controller).

The gateway 104, the media processors 106, and media devices 108 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 106 and subsystems of the IPTV media system for services such as video-on-demand (VoD), browsing an electronic programming guide (EPG), or other infrastructure services.

A satellite broadcast television system 129 can be used also in the media system of FIG. 1. The satellite broadcast television system can be overlaid, operably coupled with, or replace the IPTV system as another representative embodiment of communication system 100. In this embodiment, signals transmitted by a satellite 115 carrying media content can be received by a satellite dish receiver 131 coupled to the building 102. Modulated signals received by the satellite dish receiver 131 can be transferred to the media processors 106 for demodulating, decoding, encoding, and/or distributing broadcast channels to the media devices 108. The media processors 106 can be equipped with a broadband port to the ISP network 132 to enable interactive services such as VoD and EPG as described above.

In yet another embodiment, an analog or digital cable broadcast distribution system such as cable TV system 133 can be overlaid, operably coupled with, or replace the IPTV system and/or the satellite TV system as another representative embodiment of communication system 100. In this embodiment, the cable TV system 133 can also provide Internet, telephony, and interactive media services.

It is contemplated that the subject disclosure can apply to other present or next generation over-the-air and/or landline media content services system.

Some of the network elements of the IPTV media system can be coupled to one or more computing devices 130, a portion of which can operate as a web server for providing web portal services over an Internet Service Provider (ISP) network 132 to wireline media devices 108 or wireless communication devices 116.

Communication system 100 can also provide for all or a portion of the computing devices 130 to function as a subscriber server. The subscriber server 130 can use computing and communication technology to perform function 162, which can include among things, generating a set of name authority pointers (NAPTRs) for use in telephony communications by subscriber communication devices 116 of the communications system 100. In one embodiment, the subscriber server 130 can track subscription configurations for communication devices 116 and can determine whether the devices 116 and/or their providing networks are capable of voice and/or text message telephony using internet protocol or circuit-switched protocol. In one embodiment, where the subscriber server 130 determines that a particular subscriber communication device 116 is capable of internet protocol based voice and/or messaging telephony, then the subscriber server 130 can generate one or more NAPTRs associated with each internet protocol voice and/or text message service. These one or more internet protocol NAPTRs can each include a session initiation protocol (SIP) uniform resource identifier (URI) that identifies locations in the World Wide Web for accessing the voice and/or text message service.

In one embodiment, where the subscriber server 130 determines that a particular subscriber communication device 116 is capable of circuit-switched based voice and/or text message telephony, then the subscriber server 130 can generate one or more NAPTRs associated with the circuit-switched voice and/or text message service. These one or more circuit-switched NAPTRs can each include a tel URI that identifies a telephony location within the public switched telephone network (PSTN) for accessing the voice and/or text message service. In one embodiment, the subscriber server 130 can determine that a particular subscriber communication device 116 is capable of messaging via internet protocol but can only perform voice communication by circuit-switched protocol. In this case the subscriber server 130 can generate one or more internet protocol NAPTRs and one or more circuit-switched NAPTRs. The subscriber server 130 can send the generated NAPTRs to a telephone mapping server in the communication system 100 for use in routing telephony calls to and from the subscriber communication devices 116. The media processors 106 and wireless communication devices 116 can be adapted with software functions 164 and 166, respectively, to utilize the services of subscriber server 130.

It is further contemplated that multiple forms of media services can be offered to media devices over landline technologies such as those described above. Additionally, media services can be offered to media devices by way of a wireless access base station 117 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless network technologies are contemplated by the subject disclosure.

Figure 2:
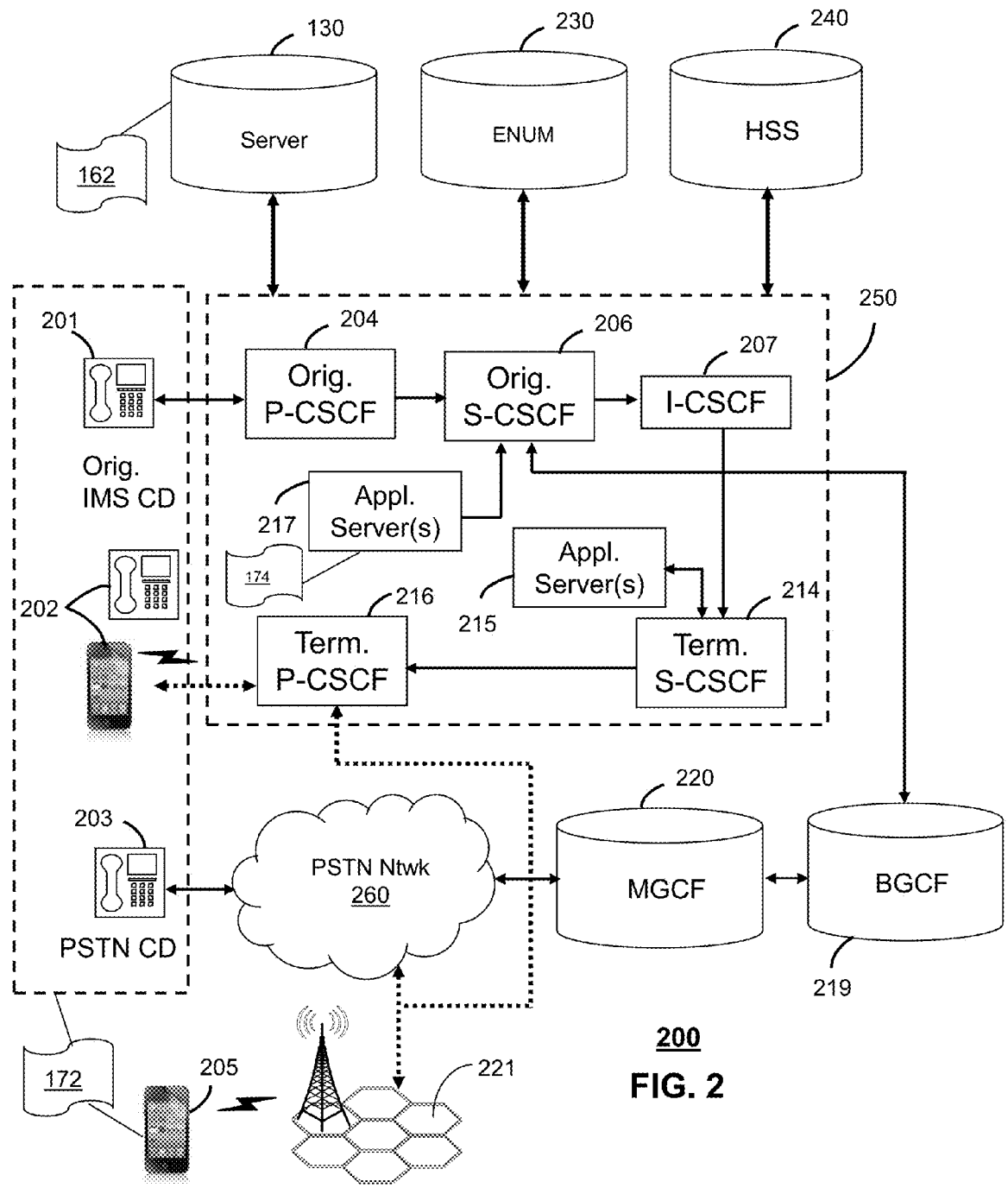

FIG. 2 depicts an illustrative embodiment of a communication system 200 employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS-compliant communication devices (CDs) 201, 202, Public Switched Telephone Network (PSTN) CDs 203, 205, and combinations thereof by way of a Media Gateway Control Function (MGCF) 220 coupled to a PSTN network 260. The MGCF 220 need not be used when a communication session involves IMS CD to IMS CD communications. A communication session involving at least one PSTN CD may utilize the MGCF 220. IMS CDs 201, 202 can register with the IMS network 250 by contacting a Proxy Call Session Control Function (P-CSCF) which communicates with an interrogating CSCF (I-CSCF), which in turn, communicates with a Serving CSCF (S-CSCF) to register the CDs with the HSS 240.

To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit the SIP INVITE message to one or more application servers (ASs) 217 that can provide a variety of services to IMS subscribers. For example, the application servers 217 can be used to perform originating call feature treatment functions on the calling party number received by the originating S-CSCF 206 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 206 can submit queries to the ENUM system 230 to translate an E.164 telephone number in the SIP INVITE message to a SIP Uniform Resource Identifier (URI) if the terminating communication device is IMS-compliant. The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE message to the terminating S-CSCF 214. The terminating S-CSCF 214 can then identify a terminating P-CSCF 216 associated with the terminating CD 202. The P-CSCF 216 may then signal the CD 202 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 2 may be interchangeable. It is further noted that communication system 200 can be adapted to support video conferencing. In addition, communication system 200 can be adapted to provide the IMS CDs 201, 202 with the multimedia and Internet services of communication system 100 of FIG. 1.

If the terminating communication device is instead a PSTN CD such as CD 203 or CD 205 (in instances where the cellular phone only supports circuit-switched voice communications), the ENUM server 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD over the PSTN network 260 to enable the calling and called parties to engage in voice and/or data communications.

In one embodiment, a CD 205 can be configured to support some types of telephony communication by internet protocol communication services but other types by circuit-switched communications. In other words, CD 205 may be restricted to use certain internet protocol based service but not others. For example, the combination of the CD 205 and the networks 250 and 260 providing communication links to the CD 205 may be configured support circuit-switched voice communication and not VoIP. At the same time, the combination of CD 205 and networks 250 and 260 can provide an internet protocol messaging service for the CD 205. That is, the CD 205 can send and receive text messages via a packet-switched, internet protocol text message service even though the CD 205 is limited to the circuit-switched domain for voice services. In one embodiment, the ENUM server 230 can be provisioned with multiple name authority pointers (NAPTRs) for each CD 205. In one embodiment, a query of the ENUM server 230 can return a series of NAPTRs corresponding to the e.164 telephone number in the SIP INVITE message. In one embodiment, a portion of the NAPTRs associated with the e.164 telephone number can by SPI URI associated with internet protocol-based services, while another portion of the NAPTRs associated with the e.164 telephone number can be tel URI associated with circuit-switched communication.

Figure 5:
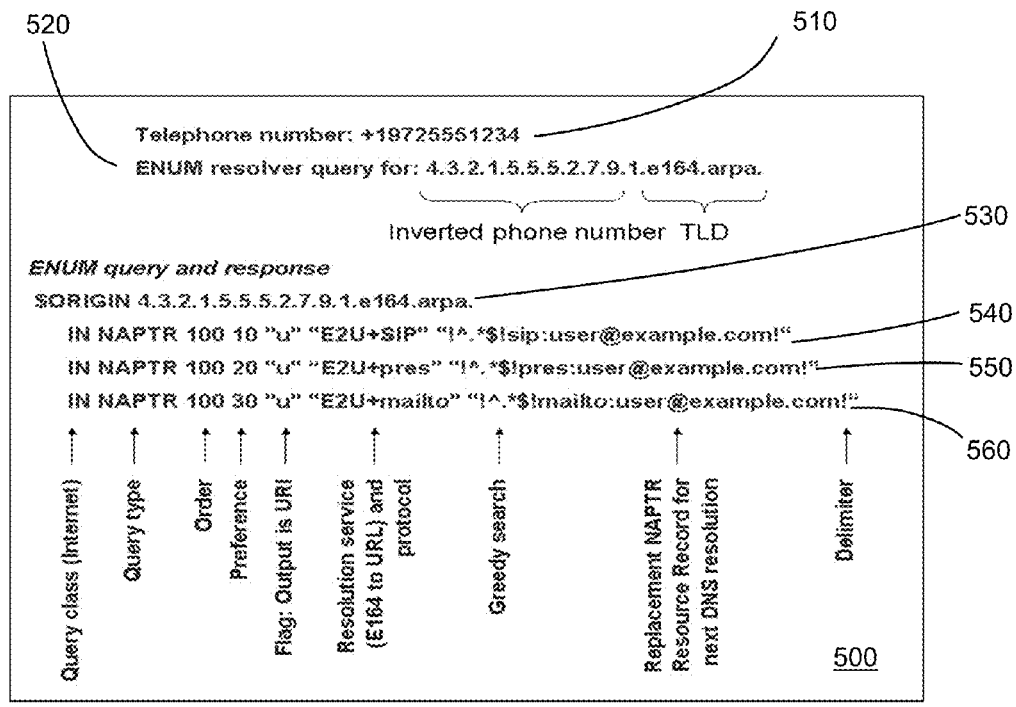
FIG. 5 depicts an illustrative embodiment of storing at a telephone number mapping (ENUM) server name authority pointers (NAPTRs) associated with a telephone number of a communication device.

Referring now to FIG. 5, an illustrative embodiment 500 depicts storing at a telephone number mapping (ENUM) server 230 a group of name authority pointers (NAPTRs) 540 and 550, each associated with a telephone number 510 of a communication device 205. In one embodiment, the subscriber server 130 can provision the series of NAPTRs 540-560 by determining which communication services have been configured for a subscriber associated with the CD 205. For example, a subscriber's profile can be configured such that any time a text message is sent to the CD 205 the text message can be routed to the CD 205 by way of internet protocol communication. In one embodiment, during subscriber registration, the initial filter criteria (iFC) settings in the HSS 240 can be configured with service awareness. For example, if the subscriber is configured for internet protocol messaging using the IMS 250 but no IMS voice service (i.e., voice service is provided by PSTN 260), then the iFC of the HSS 240 is pre-loaded with this configuration.

The subscriber server 130 (or the HSS 240) can use the iFC settings to generate the NAPTRs for storage in the ENUM server 230. In the exemplary embodiment of FIG. 5, the ENUM server 230 depicts a series of NAPTR records for internet protocol services for which the CD 205 is configured in this case. In this example, the listed NAPTRs 540-560 can correspond to three different conversions of the telephone number, "19725551234," that can be provided to the ENUM server e30 in the inverted e.164 format by the command 530, $ORIGIN. The first NAPTR 540 can return a SIP URI identifying an address for a terminating S-CSCF 214 that can route a text message the CD 205. The second NAPTR 540 can return a SIP URI identifying an address for a presence sensing application that can detect the presence of the CD 205. The third NAPTR 560 can return a SIP URI identifying an email address associated with receiving text messages for the CD 205. Each NAPTR can include an order code and a preference code. In one embodiment, the order and/or preference codes can be used to determine a chronological sequence, which the ENUM server 230 returns the NAPTR records in response to a series of queries. In one embodiment, the NAPTR with the lowest combined order and preference will be returned first by the ENUM server 230, followed by the second lowest, and so on.

Figure 6:
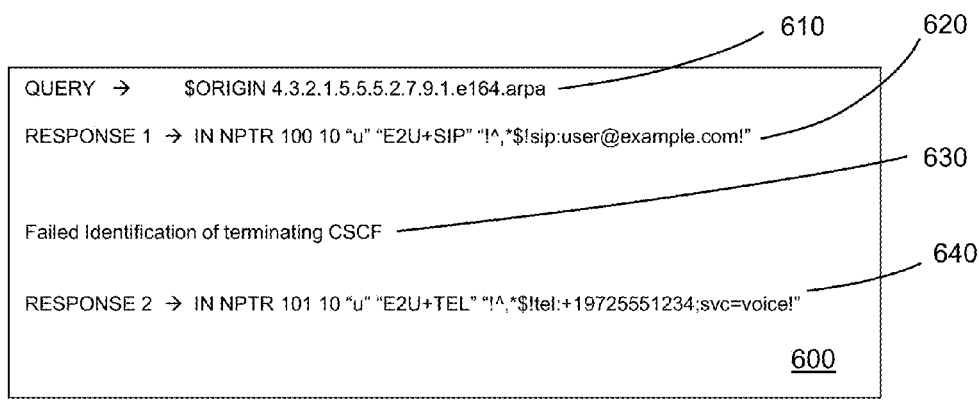
FIG. 6 depicts an illustrative embodiment of a query and response sequence for the ENUM server.

Referring now to FIG. 6, in one embodiment, the ENUM server 230 can be provisioned with a series of NAPTRs 620 and 640 that enable proper connection to the CD 205 through an internet protocol (packet-switched) link for messaging or through a circuit-switched protocol (PSTN) for voice. In one embodiment a first NAPTR 620 can include a SIP URI for identifying an address of an internet protocol based service for routing a text message to the CD 205 identified by the telephone number "19725551234." In one embodiment, a second NAPTR 640 can include a tel URI that can identify the CD 205 as configured for receiving voice over the PSTN at telephone number, "19725551234." In one embodiment, a query 610 of the ENUM server 230 can be based on the e.164 telephone number and can result in a first response 620 from ENUM server 230 in the form of the first NAPTR 620. In one embodiment, the first NAPTR can have a lower order code (100) than the second NAPTR 640 (101) to cause the ENUM server 230 to return the first NAPTR 620 before returning the second NAPTR. In one embodiment, the preference codes can be used to determine the response order. For example, the first NAPTR 620 will be returned first by the ENUM server 230 because it has a lower order, preference combination (100, 10) than the second NAPTR 640 (101, 10).

In one embodiment, an originating IMS CD 201 can request to send a text message to a terminating, non-IMS CD 205. To do this, the IMS CD 201 can submit a SIP INVITE message to an originating P-CSCF 204, which can communicate with a corresponding originating S-CSCF 206. The originating S-CSCF 206 can submit a query 610 to the ENUM server 230 to translate the E.164 telephone number in the SIP INVITE message to a SIP URI for messaging the terminating CD 205 by way of the IMS. The ENUM server 230 can then respond with the first NAPTR 620 containing the SIP URI for the messaging service. The SIP URI can be used by an Interrogating CSCF (I-CSCF) 207 to submit a query to the HSS 240 to identify a terminating S-CSCF 214 associated with a terminating IMS CD 205. Once identified, the I-CSCF 207 can submit the SIP INVITE message to the terminating S-CSCF 214. The terminating S-CSCF 214 can then identify a terminating P-CSCF 216 associated with the terminating CD 202. The P-CSCF 216 may then signal the IMS CD 205 to accept the text message via an internet protocol communication session. The embodiment thereby enables an IMS CD 201 to perform IP messaging with a non-IMS CD 205 that is configured for IP messaging but not for VoIP.

In another embodiment, the originating IMS CD 201 can attempt to request a VoIP call with the non-IMS CD 205, again, where the non-IMS CD is not configured to perform VoIP. In this case, the originating IMS CD 201 can send a SIP INVITE message to the originating P-CSCF 204, which can communicate with a corresponding originating S-CSCF 206. The originating S-CSCF 206 can query the ENUM server 230 using the telephone number of the non-IMS CD 205, and the ENUM server 230 can return the first NAPTR 620, as above. However, when the originating I-CSCF 207 uses the SIP URI from the ENUM server 230 to request an identity of a terminating S-CSCF 214 for providing VoIP for the non-IMS CD 205, the HSS 240 can return a notice to the originating I-CSCF 207 indicating an unsuccessful identification. At this point, the originating S-CSCF 206 can send a notification of the unsuccessful identification to the ENUM server 230, which can then respond with a second NAPTR 640 in the sequence. The second NAPTR 640 can be a tel NAPTR that provides a tel URI. The originating I-CSCF 207 can use the tel URI, forwarded to the MGCF 220 via a Breakout Gateway Control Function (BGCF) 219. The MGCF 220 can then initiate the call to the terminating non-IMS CD 205 over the PSTN network 260 to enable the calling and called parties to engage in voice and/or data communications.

It is further appreciated that the CDs of FIG. 2 can operate as wireline or wireless devices. For example, the CDs of FIG. 2 can be communicatively coupled to a cellular base station 221, a femtocell, a WiFi router, a DECT base unit, or another suitable wireless access unit to establish communications with the IMS network 250 of FIG. 2. The cellular access base station 221 can operate according to common wireless access protocols such as Global System for Mobile (GSM), Code Division Multiple Access (CDMA), Time Division Multiple Access (TDMA), Universal Mobile Telecommunications (UMTS), World interoperability for Microwave (WiMAX), Software Defined Radio (SDR), Long Term Evolution (LTE), and so on. Other present and next generation wireless network technologies are contemplated by the subject disclosure. Accordingly, multiple wireline and wireless communication technologies are contemplated for the CDs of FIG. 2.

It is further contemplated that cellular phones supporting LTE can support packet-switched voice and packet-switched data communications and thus may operate as IMS-compliant mobile devices. In this embodiment, the cellular base station 221 may communicate directly with the IMS network 250 as shown by the arrow connecting the cellular base station 221 and the P-CSCF 216.

It is further understood that alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS and ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The subscriber server 130 of FIG. 1 can be operably coupled to the second communication system 200 for purposes similar to those described above. It is further contemplated by the subject disclosure that the subscriber server 130 can perform function 162 and thereby provide NAPTRs for use in telephony communications involving the CDs 201, 202, 203 and 205 of FIG. 2. CDs 201, 202, 203 and 205, which can be adapted with software to perform function 172 to utilize the services of the subscriber server 130. It is further contemplated that the subscriber server 130 can be an integral part of the application server(s) 217 performing function 174, which can be substantially similar to function 162 and adapted to the operations of the IMS network 250.

Figure 3:
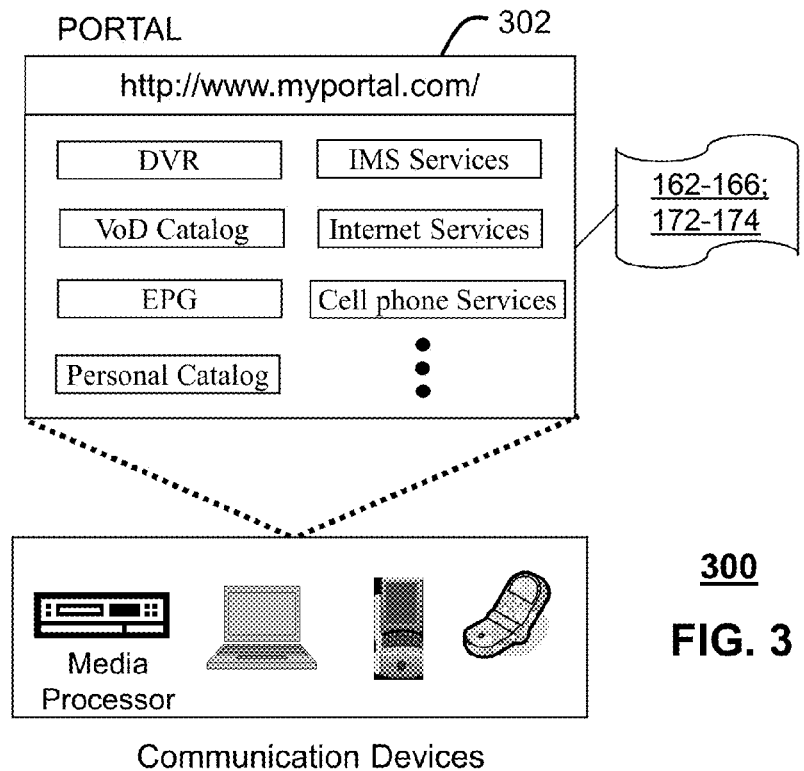
FIG. 3 depicts an illustrative embodiment of a web portal for interacting with the communication systems of FIGS. 1-2.

FIG. 3 depicts an illustrative embodiment of a web portal 302 which can be hosted by server applications operating from the computing devices 130 of the communication system 100 illustrated in FIG. 1. The web portal 302 can be used for managing services of communication systems 100-200. A web page of the web portal 302 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 1-2. The web portal 302 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 302 can also be used for provisioning IMS services described earlier, provisioning Internet services, provisioning cellular phone services, and so on.

It is contemplated by the subject disclosure that the web portal 302 can further be utilized to manage and provision software applications 162-166, and 172-174 to adapt these applications as may be desired by subscribers and service providers of communication systems 100-200.

Figure 4:
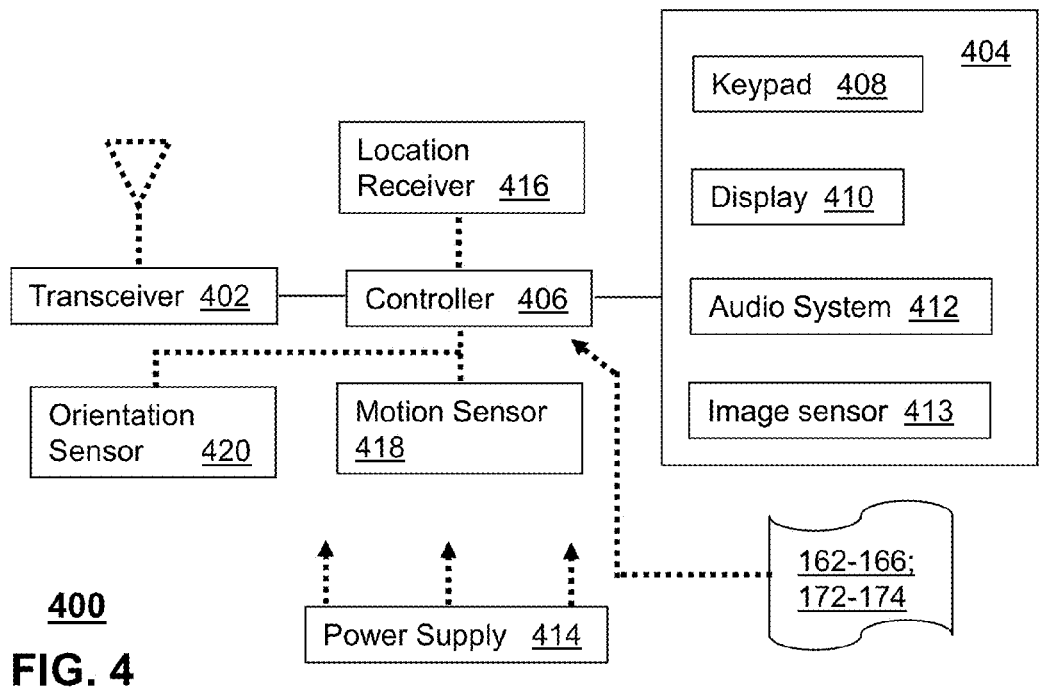
FIG. 4 depicts an illustrative embodiment of a communication device utilized in the communication systems of FIGS. 1-2.

FIG. 4 depicts an illustrative embodiment of a communication device 400. Communication device 400 can serve in whole or in part as an illustrative embodiment of the devices depicted in FIGS. 1-2. The communication device 400 can comprise a wireline and/or wireless transceiver 402 (herein transceiver 402), a user interface (UI) 404, a power supply 414, a location receiver 416, a motion sensor 418, an orientation sensor 420, and a controller 406 for managing operations thereof. The transceiver 402 can support short-range or long-range wireless access technologies such as Bluetooth, ZigBee, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, software defined radio (SDR), Long Term Evolution (LTE), as well as other next generation wireless communication technologies as they arise. The transceiver 402 can also be adapted to support circuit-switched wireline access technologies (such as PSTN), packet-switched wireline access technologies (such as TCP/IP, VoIP, etc.), and combinations thereof.

The UI 404 can include a depressible or touch-sensitive keypad 408 with a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric keypad commonly used by phones, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display 410 with navigation features.

The display 410 can use touch screen technology to also serve as a user interface for detecting user input (e.g., touch of a user's finger). As a touch screen display, the communication device 400 can be adapted to present a user interface with graphical user interface (GUI) elements that can be selected by a user with a touch of a finger. The touch screen display 410 can be equipped with capacitive, resistive or other forms of sensing technology to detect much surface area of a user's finger has been placed on a portion of the touch screen display. This sensing information can be used control the manipulation of the GUI elements.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. Alternatively, the charging system can utilize external power sources such as DC power supplied over a physical interface such as a USB port. The location receiver 416 can utilize common location technology such as a global positioning system (GPS) receiver capable of assisted GPS for identifying a location of the communication device 400 based on signals generated by a constellation of GPS satellites, thereby facilitating common location services such as navigation. The motion sensor 418 can utilize motion sensing technology such as an accelerometer, a gyroscope, or other suitable motion sensing to detect motion of the communication device 400 in three-dimensional space. The orientation sensor 420 can utilize orientation sensing technology such as a magnetometer to detect the orientation of the communication device 400 (North, South, West, East, combined orientations thereof in degrees, minutes, or other suitable orientation metrics).

The communication device 400 can use the transceiver 402 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such as Flash, ROM, RAM, SRAM, DRAM or other storage technologies.

Other components not shown in FIG. 4 are contemplated by the subject disclosure. For instance, the communication device 400 can include a reset button (not shown). The reset button can be used to reset the controller 406 of the communication device 400. In yet another embodiment, the communication device 400 can also include a factory default setting button positioned below a small hole in a housing assembly of the communication device 400 to force the communication device 400 to re-establish factory settings. In this embodiment, a user can use a protruding object such as a pen or paper clip tip to reach into the hole and depress the default setting button.

The communication device 400 as described herein can operate with more or less components described in FIG. 4. These variant embodiments are contemplated by the subject disclosure.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

It is contemplated by the subject disclosure that the communication device 400 shown in FIG. 4 or portions thereof can serve as a representation of one or more of the devices of communication systems 100-200. It is further contemplated that the controller 406 can be adapted in various embodiments to perform the functions 162-166 and 172-174, respectively.

Figure 7:
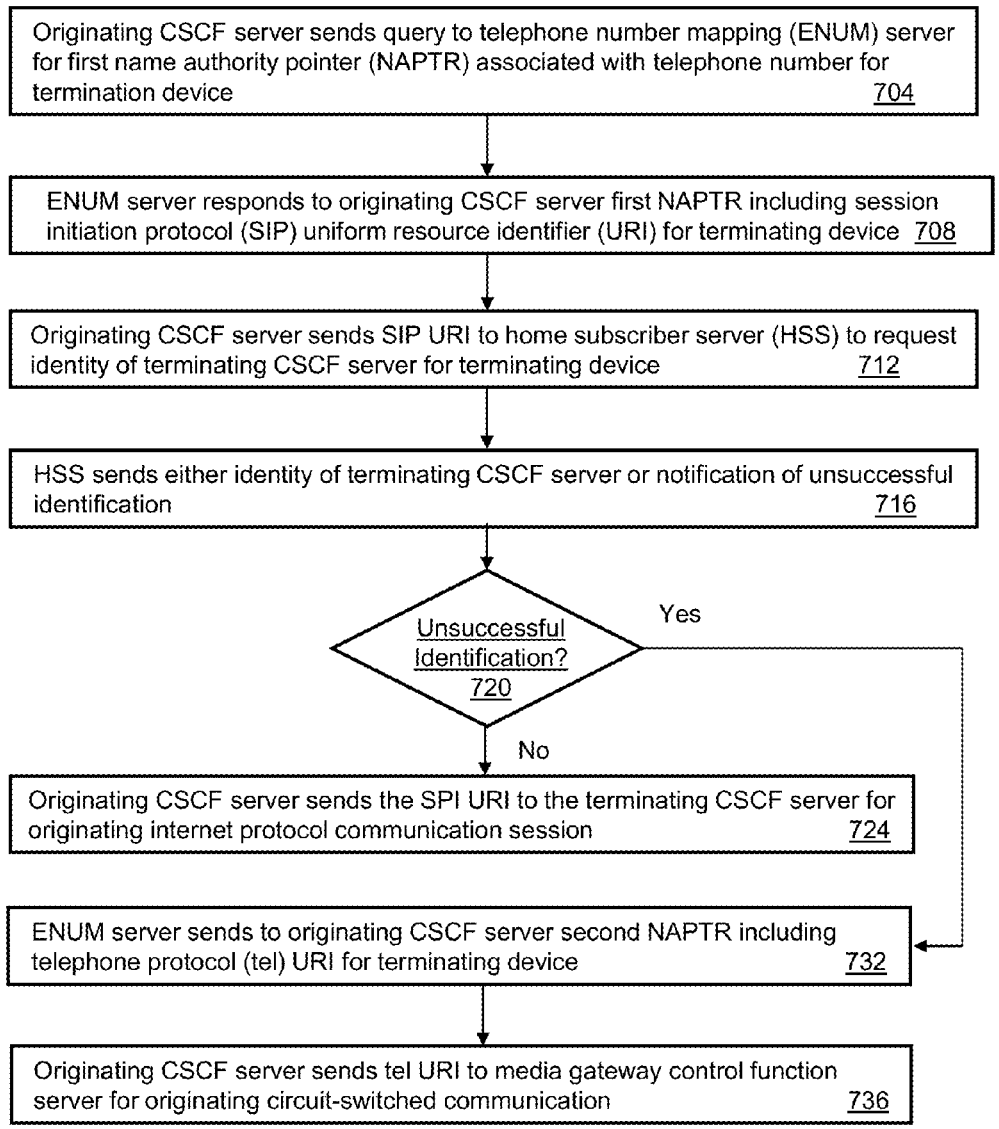
FIG. 7 depicts an illustrative embodiment of a method operating in portions of the systems described in FIGS. 1-6.

FIG. 7 depicts an illustrative method 700 that operates in portions of the devices of FIGS. 1-5. Method 700 can begin with step 704 in which, in response to an originating CD 201 can send a request to an originating CSCF 206, the originating CSCF 206 send a query to an ENUM server 230. The query can request first NAPTR associated with a telephone number of a terminating CD 205 that is a subject of a requested communication session. In one embodiment, the originating CD 201 can be requesting a voice call with the terminating CD 205. In one embodiment, the originating CD 201 can be requesting to a messaging communication with the terminating CD 205. In one embodiment, the originating CSCF server 206 can send a query command 610, such as a "$ORIGIN" command, to the ENUM server 230. In one embodiment, the query command 610 can include a telephone number, which may or may not be in e.164 format. In one embodiment, the ENUM server can 230 can index groups of NAPTRs according to telephone numbers. In one embodiment, the ENUM server 230 can index NAPTR records according to portions of telephone numbers. For example, the ENUM server 230 can index NAPTR records according to area codes and/or exchanges or can organize a hierarchy of NAPTR records according area codes and/or exchanges.

In step 708, the ENUM server 230 can send to the originating CSCF server 206 the first NAPTR 620. In one embodiment, the first NAPTR 620 includes a SIP URI that can be used to identify an internet protocol based service for the terminating CD 205. In step 712, the originating CSCF 206 can send the SIP URI from the first NAPTR 620 to a home subscriber server (HSS) 240 to request an identity of a terminating CSCF server 214 for the terminating CD 205.

In step 716, the HSS 240 can send to the originating CSCF server 206 either an identity of the terminating CSCF server 214 of a notification of an unsuccessful identification of the CSCF server 214. If the HSS 240 correctly identifies the terminating CSCF server 214, in step 720, then, in step 724, the originating CSCF server 206 can send the SPI URI to the terminating CSCF server 214 for originating an internet protocol communication session with the terminating CD 205.

If the HSS 240 sends a notification of an unsuccessful identification of the terminating CSCF server 214, in step 720, then, in step 732, the ENUM server 230 can transmit to the originating CSCF 206 the second NAPTR 640.The second NAPTR 640 can include a tel URI for identifying the terminating CD 205 and indicating that the terminating CD 205 is accessible for voice communications over the circuit-switched PSTN. In step 736, the originating CSCF 213 can transmit the tel URI to a media gateway control function (MGCF) 220 for originating the circuit-switched communication session with the terminating CD 205.

Upon reviewing the aforementioned embodiments, it would be evident to an artisan with ordinary skill in the art that said embodiments can be modified, reduced, or enhanced without departing from the scope and spirit of the claims described below. For example, after a notification from the HSS 240 of an unsuccessful attempt to identify the terminating CSCF 214, the ENUM 230 can respond with a third NAPTR, where the third NAPTR points to an alternative address or location for performing the requested communication by internet protocol (packet-switched) communication. For example, the ENUM can include multiple options or routing paths for a requested VoIP call. A failure of a first path, as specified in the first NAPTR 620, can be followed by an attempt to connect the VoIP through an alternative service at an alternative address.

In another embodiment, the ENUM server 230 can return both the first and second NAPTRs 620 and 640 in response to the first request 610 from the originating CSCF 214. The originating CSCF 214 can then temporarily the second NAPTR 640 and wait to see if this pointer is needed. If the HSS 240 returns a notification that the terminating CSCF 214 cannot be located, then the originating CSCF 214 can fetch the second NAPTR 640 from local memory and use the tel URI for establishing the circuit-switched connection to the terminating CD 205. Other embodiments are contemplated by the subject disclosure.

In another embodiment, the NAPTRs stored in the ENUM 230 can be updated according to user selections captured at a web portal 302 or according to changes in user profile made by the service provider and updated into the HSS 240.

In another embodiment, the non-IMS, terminating CD 205 can be configured to perform VoIP using an IP service but not configured to perform IP messaging. In this case, the first NAPTR can include a SIP URI for a VoIP service, and the second NAPTR can include a tel URI for messaging. Again, the ability to direct the routing of the VoIP or circuit-switched text message via the ENUM server 230 allows for a mixed mode operation where the non-IMS, terminating CD 205 can selectively use or not use IP-based services.

Figure 8:
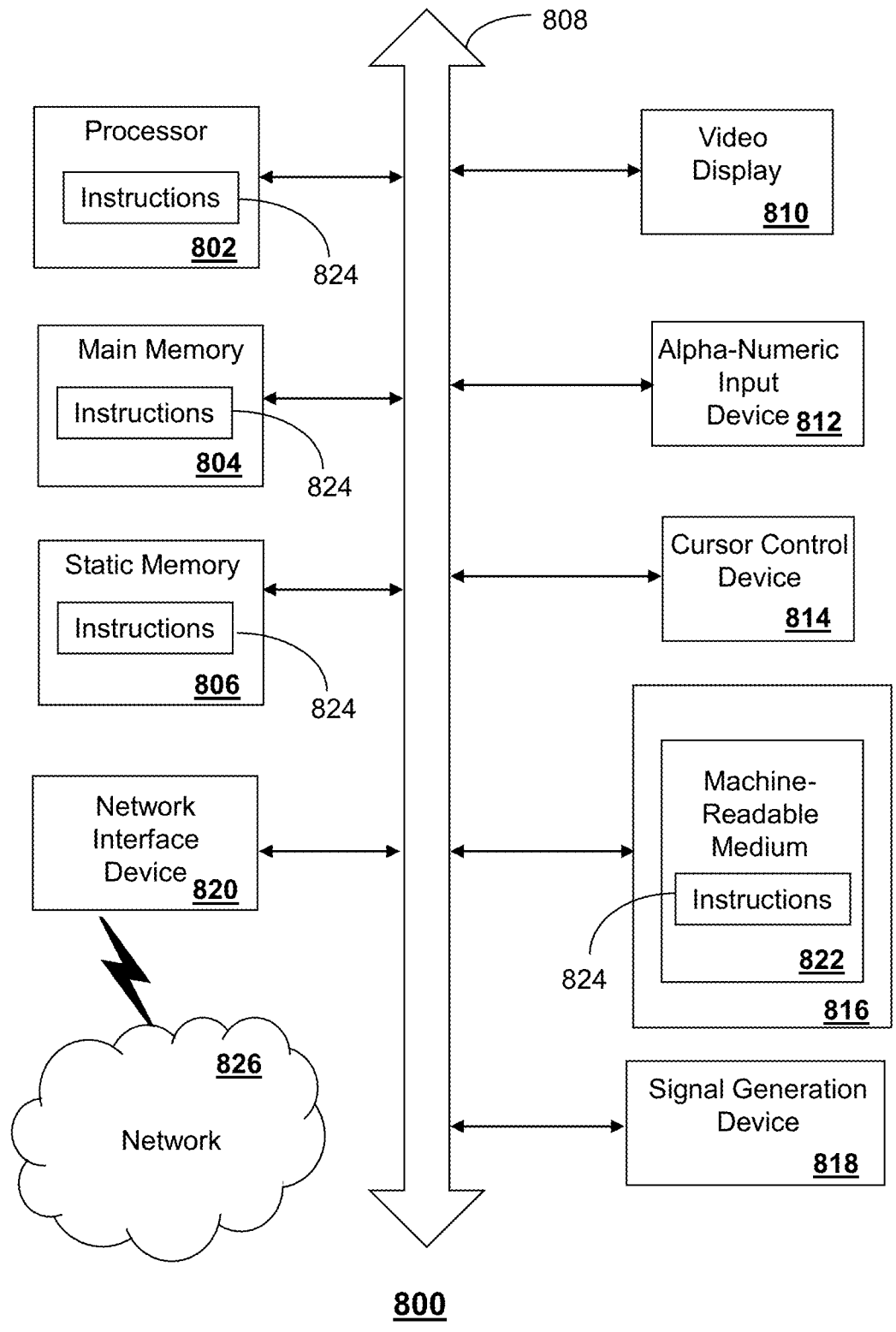
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods discussed above. One or more instances of the machine can operate, for example, as the subscriber server 130, media processor 106, CDs 201-205, originating CSCF 206, terminating CSCF 214, HSS 240, ENUM server 230, and other devices of FIGS. 1-4. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor 802 (e.g., a central processing unit (CPU), a graphics processing unit (GPU, or both), a main memory 804 and a static memory 806, which communicate with each other via a bus 808. The computer system 800 may further include a video display unit 810 (e.g., a liquid crystal display (LCD), a flat panel, or a solid state display. The computer system 800 may include an input device 812 (e.g., a keyboard), a cursor control device 814 (e.g., a mouse), a disk drive unit 816, a signal generation device 818 (e.g., a speaker or remote control) and a network interface device 820.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) are contemplated for use by computer system 800.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, are contemplated by the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
   transmitting, by a telephone number mapping (ENUM) server, a first name authority pointer (NAPTR) to an originating call session control function (CSCF) server, wherein the first NAPTR comprises a session initiation protocol (SIP) uniform resource identifier (URI) associated with a terminating device;
   receiving, by the originating CSCF server, one of an identity of a terminating CSCF server associated with the terminating device or a notification of an unsuccessful identification of the terminating CSCF server;
   transmitting, by the originating CSCF server and responsive to receiving of the identity of the terminating CSCF server, the SIP URI of the first NAPTR to the terminating CSCF server to initiate a packet-switched communication session;
   transmitting to the originating CSCF server, by the ENUM server, the second NAPTR comprising a telephone protocol (tel) URI associated with the terminating device responsive to receiving the notification of the unsuccessful identification of the terminating CSCF server; and transmitting to a media gateway control function (MGCF) server, by the originating CSCF server and responsive to the originating CSCF server receiving the second NAPTR, the tel URI of the second NAPTR to initiate a circuit-switched communication session.

2. The method of claim 1, comprising transmitting, by the originating CSCF server, a query to the ENUM server for the first NAPTR associated with a telephone number of the terminating device.

3. The method of claim 1, comprising:
transmitting, by the originating CSCF server, the SIP URI of the first NAPTR to a home subscriber server (HSS) to request the identity of the terminating CSCF server associated with the terminating device; and
transmitting, by the HSS, to the originating CSCF server one of the identity of the terminating CSCF server or the notification of the unsuccessful identification of the terminating CSCF server.

4. The method of claim 3, wherein the notification of the unsuccessful identification of the terminating CSCF server comprises blocking access at the HSS to an unauthorized service.

5. The method of claim 1, wherein the first NAPTR identifies a text message service and wherein the second NAPTR identifies a voice service.

6. A device, comprising:
a processor; and
a memory that stores executable instructions that, when executed by the processor, facilitates performance of operations, comprising:
receiving from a telephone number mapping (ENUM) server a first pointer comprising a session initiation protocol (SIP) uniform resource identifier (URI) associated with a terminating device;
transmitting a request to a subscriber server for an identity of a terminating call session function (CSCF) server associated with the terminating device;
receiving from the subscriber server one of an identity of the terminating CSCF server or a notification of an unsuccessful identification of the terminating CSCF server;
transmitting the SIP URI of the first pointer responsive to receiving the identity of the terminating CSCF server and to the terminating CSCF server to initiate a packet-switched communication session with the terminating device;
receiving a second pointer comprising a telephone protocol (tel) URI associated with the terminating device responsive to receiving the notification of the unsuccessful identification of the terminating CSCF server; and
transmitting the tel URI of the second pointer responsive to receiving the second pointer and to a gateway server to initiate a circuit-switched communication session with the terminating device.

7. The device of claim 6, wherein the SIP URI of the first pointer identifies a text message service and wherein the tel URI of the second pointer identifies a voice service.

8. The device of claim 6, wherein the processor, responsive to executing the executable instructions, performs operations comprising transmitting a query to the ENUM server for the first pointer associated with a telephone number of the terminating device.

9. The device of claim 6, wherein the transmitting of the request to the subscriber server comprises transmitting the SIP URI of the first pointer to the subscriber server.

10. The device of claim 6, wherein the notification of the unsuccessful identification of the terminating CSCF server comprises blocking access at the subscriber server to an unauthorized service.

11. The device of claim 6, comprising:
receiving from the ENUM server a third pointer comprising a second SIP URI associated with the terminating device, wherein ENUM compares order codes, preference codes, or a combination thereof, of the first pointer and the third pointer to determine a sequence for sending the first pointer and the third pointer.

12. The device of claim 6, wherein the SIP URI of the first pointer identifies one of a multimedia voice service, a multimedia text message service, or a combination thereof.

13. A non-transitory computer-readable storage medium, comprising executable instructions, which when executed by a processor, facilitate performing of operations comprising:
receiving a query from a call session server for a first pointer associated with a telephone number of a terminating device of a requested communication session;
transmitting to the call session server the first pointer comprising a session initiation protocol uniform resource identifier associated with the terminating device to initiate an internet protocol communication session;
receiving a notification from the call session server responsive to the call session server failing to initiate the internet protocol communication session; and
transmitting to the call session server a second pointer comprising a telephone protocol uniform resource identifier responsive to receiving the notification and for originating a circuit-switched communication session.

14. The non-transitory computer-readable storage medium of claim 13, wherein the first pointer identifies a text message service and wherein the second pointer identifies a voice service.

15. The non-transitory computer-readable storage medium of claim 13, comprising executable instructions which, when executed by the processor, facilitate the performing of operations comprising:
receiving the first and second pointers from a home subscriber server; and
storing the first and second pointers.

16. The non-transitory computer-readable storage medium of claim 13, wherein the first pointer is associated with a subscribed communication service of the terminating device.

17. The non-transitory computer-readable storage medium of claim 13, wherein the call session server transmits the session initiation protocol uniform resource identifier to a home subscriber server with a request for an identity of a terminating call session server to initiate the internet protocol communication session.

18. The non-transitory computer-readable storage medium of claim 13, wherein the call session server fails to initiate the internet protocol communication session responsive to receiving a message from a home subscriber server indicating that a terminating call session server cannot be identified with the first pointer.

19. The non-transitory computer-readable storage medium of claim 13, comprising executable instructions which, when executed by the processor, facilitate the performing of operations comprising transmitting a third pointer associated with the terminating device, wherein the third pointer comprises a second session initiation protocol uniform resource identifier.

20. The non-transitory computer-readable storage medium of claim 13, wherein the session initiation protocol uniform resource identifier of the first pointer identifies one of a multimedia voice service, a multimedia text message service, or a combination thereof.

\* \* \* \* \*